United States Patent
Hashimoto et al.

(10) Patent No.: US 11,268,467 B2
(45) Date of Patent: *Mar. 8, 2022

(54) CONTROLLER AND CONTROL METHOD FOR INTERNAL COMBUSTION ENGINE

(71) Applicant: TOYOTA JIDOSHA KABUSHIKI KAISHA, Toyota (JP)

(72) Inventors: Yosuke Hashimoto, Nagakute (JP); Akihiro Katayama, Toyota (JP); Yuta Oshiro, Nagoya (JP); Kazuki Sugie, Toyota (JP); Naoya Oka, Nagakute (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/151,721

(22) Filed: Jan. 19, 2021

(65) Prior Publication Data
US 2021/0231070 A1 Jul. 29, 2021

(30) Foreign Application Priority Data
Jan. 27, 2020 (JP) .............................. JP2020-010533

(51) Int. Cl.
*F02D 41/14* (2006.01)
*F02D 41/24* (2006.01)
(Continued)

(52) U.S. Cl.
CPC ........ *F02D 41/1402* (2013.01); *F02D 11/105* (2013.01); *F02D 41/0002* (2013.01);
(Continued)

(58) Field of Classification Search
CPC ............... F02D 11/105; F02D 41/0002; F02D 41/1402; F02D 41/1405; F02D 41/1406;
(Continued)

(56) References Cited

U.S. PATENT DOCUMENTS 6,032,139 A * 2/2000 Yamaguchi ......... F02D 41/1401
706/13
6,064,996 A * 5/2000 Yamaguchi ........ G05B 13/0265
706/13
(Continued)

FOREIGN PATENT DOCUMENTS

JP 2016-6327 A 1/2016

OTHER PUBLICATIONS

Lin Xue et al., "Reinforcement Learning Based Power Management for Hybrid Electric Vehicles", 2014 IEEE/ACM International Conference on Computer-Aided Design (ICCAD), IEEE, Nov. 2, 2014, pp. 32-38 (Year: 2014).*

(Continued)

*Primary Examiner* — John M Zaleskas
(74) *Attorney, Agent, or Firm* — Oblon, McClelland, Maier & Neustadt, L.L.P.

(57) ABSTRACT

A controller includes a memory device and an execution device, which executes an operation of an operated unit of an internal combustion engine. The execution device executes a first calculation process that uses adapted data sets in order to calculate an operated amount on the basis of a detected value of a state variable, a second calculation process that calculates, as the operated amount, a value that is determined by a relationship defining data set and the state variable, a reinforcement learning process that updates the relationship defining data set, first and operation processes that operate the operated unit in accordance with a calculated value of the operated amount, and a switching process that switches a process that operates the operated unit between the first operation process and the second operation process in accordance with the state of the vehicle.

6 Claims, 5 Drawing Sheets

(51) Int. Cl.
*F02D 41/00* (2006.01)
*F02D 41/10* (2006.01)
*F02P 5/152* (2006.01)
*F02D 11/10* (2006.01)

(52) U.S. Cl.
CPC ......... *F02D 41/10* (2013.01); *F02D 41/1406* (2013.01); *F02D 41/2422* (2013.01); *F02D 41/2454* (2013.01); *F02P 5/1521* (2013.01); *F02D 2041/1431* (2013.01); *F02D 2041/1432* (2013.01); *F02D 2200/602* (2013.01)

(58) Field of Classification Search
CPC ............. F02D 41/2422; F02D 41/2438; F02D 2041/1431; F02D 2200/60; F02D 2200/602; G06N 3/08; G06N 20/10
See application file for complete search history.

(56) References Cited

U.S. PATENT DOCUMENTS

| | | | | |
|---|---|---|---|---|
| 6,425,374 | B1* | 7/2002 | Schmitz | F02D 41/2432 123/436 |
| 6,549,815 | B1* | 4/2003 | Kaji | G05B 13/0285 700/108 |
| 2004/0078095 | A1* | 4/2004 | Mizutani | G05B 13/0265 700/28 |
| 2012/0117011 | A1* | 5/2012 | Hashimoto | G05B 13/027 706/23 |
| 2017/0234251 | A1* | 8/2017 | Commenda | G01M 15/00 701/33.1 |
| 2018/0293814 | A1* | 10/2018 | Gilbert | B60W 40/00 |
| 2019/0242319 | A1* | 8/2019 | Matsumoto | G06N 3/08 |
| 2019/0329772 | A1* | 10/2019 | Graves | B60W 30/0956 |
| 2020/0063676 | A1* | 2/2020 | Neema | F02D 41/0077 |
| 2020/0063681 | A1* | 2/2020 | Neema | F02D 41/0062 |
| 2020/0164745 | A1* | 5/2020 | Mohan | G05B 13/048 |
| 2020/0398859 | A1* | 12/2020 | Borhan | B60W 50/0097 |
| 2021/0115834 | A1* | 4/2021 | Hashimoto | B60W 20/16 |
| 2021/0115866 | A1* | 4/2021 | Hashimoto | G01M 15/00 |
| 2021/0189990 | A1* | 6/2021 | Hashimoto | F02D 41/1454 |
| 2021/0222640 | A1* | 7/2021 | Hashimoto | F02D 41/10 |
| 2021/0239060 | A1* | 8/2021 | Hashimoto | F02D 41/2441 |

OTHER PUBLICATIONS

Hu Yue et al., "Energy Management Strategy for a Hybrid Electric Vehicle Based on Deep Reinforcement Learning", Applied Sciences, vol. 8, No. 2, Jan. 26, 2018, pp. 1-15 (Year: 2018).*

Hu Xiasong et al., "Reinforcement Learning for Hybrid and Plug-In Hybrid Electric Vehicle Energy Management: Recent Advances and Prospects", IEEE Industrial Electronics Magazine, IEEE, US, vol. 13, No. 3, Sep. 24, 2019, pp. 16-25 (Year: 2019).*

Notice of Allowance issued in U.S. Appl. No. 17/163,784 dated Sep. 3, 2021.

U.S. Notice of Allowance issued in U.S. Appl. No. 17/140,208 dated Aug. 3, 2021.

Notice of Corrected Allowability issued in U.S. Appl. No. 17/140,208 dated Sep. 23, 2021 Examiner Dallo, Joseph J.

Notice of Corrected Allowability issued in U.S. Appl. No. 17/163,784 dated Sep. 29, 2021 Examiner Mark L Greene.

* cited by examiner

CONTROLLER AND CONTROL METHOD FOR INTERNAL COMBUSTION ENGINE

BACKGROUND

1. Field

The present disclosure relates to a controller and a control method for an internal combustion engine mounted on a vehicle.

2. Description of Related Art

Japanese Laid-Open Patent Publication No. 2016-006327 discloses a controller that operates a throttle valve, which is an operated unit of an internal combustion engine mounted on a vehicle, on the basis of a value obtained by subjecting an operated amount (e.g. depression amount) of an accelerator pedal to a process using a filter.

The above-described filter is required to set the operated amount of the throttle valve to a value that simultaneously satisfies demands for multiple factors such as the efficiency and exhaust characteristics of an internal combustion engine, and occupant comfort. Thus, adaptation of the filter requires a high number of man-hours of skilled workers. This also applies to adaptation of operated amounts of operated units of the engine other than the throttle valve.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a first general aspect, a controller for an internal combustion engine mounted on a vehicle is provided. The controller is configured to change a controlled variable of the internal combustion engine by operating an operated unit of the internal combustion engine. The controller includes a memory device and an execution device. The memory device is configured to store, in advance a relationship defining data set and an adapted data set. The relationship defining data set defines a relationship between a state variable that represents a state of the vehicle, which includes a state of the internal combustion engine, and an operated amount of the operated unit, the relationship defining data set being updated during traveling of the vehicle. The adapted data set is used to calculate the operated amount based on a detected value of the state variable. The adapted data set is not updated during traveling of the vehicle. The execution device is configured to execute an operation of the operated unit. The execution device is configured to execute: a first calculation process that uses the adapted data in order to calculate the operated amount on a basis of the detected value of the state variable; a second calculation process that calculates, as the operated amount, a value that is determined by the relationship defining data set and the state variable; a reinforcement learning process that calculates a reward on a basis of the detected value of the state variable when the operated unit is being operated by the operated amount calculated by the second calculation process, and updates the relationship defining data set so as to increase an expected return of the reward on a basis of the state variable, the operated amount, and the reward; a first operation process that executes the first calculation process, and operates the operated unit in accordance with a calculated value of the operated amount by the first calculation process; a second operation process that executes both of the first calculation process and the second calculation process, and operates the operated unit in accordance with a calculated value of the operated amount by the second calculation process; and a switching process that switches a process that operates the operated unit between the first operation process and the second operation process in accordance with the state of the vehicle.

The first operation process operates the operated unit by the operated amount calculated by the first calculation process, which uses the adapted data set stored in the memory device in advance. The operated amount must be adapted prior to shipping of the vehicle in the first operation process. The second operation process operates the operated unit by the operated amount calculated by the second calculation process, which uses the relationship defining data set updated through the reinforcement learning process during traveling of the vehicle. The adaptation of the operated amount is automatically advanced during traveling of the vehicle in the second operation process. This reduces the number of man-hours of skilled workers required to adapt the operated amount. However, the reinforcement learning must be performed under various conditions of the vehicle while taking relatively long amounts of time. Thus, depending on the operation of the vehicle, it takes a considerable amount of time to complete the adaptation. Therefore, depending on the operation of the vehicle, more desirable outcomes may be produced by completing the adaptation of the operated amount before the shipment of the vehicle than by adapting the operated amount through reinforcement learning during traveling of the vehicle. In this regard, the execution device in the above-described controller of an internal combustion engine switches, in the switching process, the process of operating the operated unit in accordance with the state of the vehicle between the first operation process and the second operation process. Therefore, the above-described controller for an internal combustion engine readily reduces the number of man-hours of skilled workers required to adapt the operated amount of the operated unit of the internal combustion engine.

In some cases, the values used to calculate the operated amount in the first operation process include a value that is updated in accordance with an update amount calculated from the value of the state variable at each calculation of the operated amount. The update of the value in this case is performed on the basis of an instantaneous value of the state variable at the time. The updated value is a value that is obtained by integrating the update amount calculated on the basis of the value of the state variable of each calculation of the operated amount up to that moment. In this manner, even in a case in which the calculation of the operated amount in the first operation process is performed on the basis of the instantaneous value of the state variable, the operated amount may be calculated as a value that reflects changes in the state variable up to that moment. In such a case, the calculated value of the operated amount immediately after switching from the second operation process to the first operation process does not reflect the changes in the state variable during the second operation process. Thus, the operated amount is set to a value different from that in a case in which the first operation process has been continued.

In this regard, the above-described controller for an internal combustion engine executes the calculation of the operated amount using the first calculation process even in the second operation process, which operates the operated unit by the operated amount calculated in the second calculation process. In this manner, the above-described controller for an internal combustion engine continues the calculation of the operated amount using the first calculation process even during the execution of the second operation process. Thus, immediately after switching from the second operation process to the first operation process, the operated amount is calculated as a value that reflects changes in the value of the state variable during the execution of the second operation process prior to the switching. The calculated value of the operated amount by the first calculation process during the execution of the second operation process is not used in the actual operation of the operated unit. Only a simplified adaptation needs to be performed for the operated amount of the first calculation process in a state of the vehicle in which the second operation process is executed. Therefore, the number of man-hours of skilled workers required to adapt the operated amount of the operated unit of the internal combustion engine is reduced as compared to a case in which the operated unit of the internal combustion engine is operated only by the first operation process without switching the operation process.

The above-described controller for an internal combustion engine executes both of the first calculation process and the second calculation process during the execution of the second operation process. This increases the calculation load on the execution device. In this regard, when the operated amount calculated by the first calculation process includes a value that is uniquely determined from an instantaneous value of the state variable at each moment, the calculation result of the operated amount remains the same between a case in which the calculation is continued during the execution of the second operation process and a case in which the calculation is discontinued during the execution of the second operation process. Thus, in order to limit increase in the calculation load on the execution device at the execution of the second operation process, the first calculation process may calculate only one or more of the operated amounts, which are operated during operations of the operated units by the first operation process, during operations of the operated units by the second operation process.

The first calculation process may include a feedback correction process that is executed at calculation of the operated amount, and corrects the first operated amount in accordance with a deviation of a detected value of the controlled variable from a target value. It takes a certain amount of time for the feedback correction process to cause the controlled variable to converge to the target value. Thus, when the feedback correction process is started at the same time as when the second operation process is switched to the first operation process, the controlled variable temporarily deviates from the target value. The controllability of the internal combustion engine thus may deteriorate. Therefore, the operated amount that is calculated through the feedback correction process is preferably included in the above-described one or more operated amounts, which continue to be calculated by the first calculation process during the execution of the second operation process.

Also, when the first calculation process includes the operated amount that is calculated through a gradual change process below, that operated amount is preferably included in the above-described one or more operated amounts, which continue to be calculated by the first calculation process during the execution of the second operation process. The calculation of the operated amount through the gradual change process uses a data set included in the adapted data sets that is a data set defining a map that uses a specific state variable as an input and outputs the operated amount. The gradual change process is one of the following processes: a process that uses a detected value of a state variable as an input, and outputs, as an input value to the map, a value that changes after a delay in relation to the detected value, and a process that uses an output value of the map as an input, and outputs a value that changes after a delay in relation to the output value as a calculated value of an operated amount.

Some vehicles perform a manual acceleration travel, in which the vehicle is accelerated or decelerated in response to an operation of an accelerator pedal by a driver, and an automatic acceleration travel, in which the vehicle is automatically accelerated or decelerated regardless of the operation of the accelerator pedal. In such a vehicle, the operation of the internal combustion engine can vary significantly between the automatic acceleration travel and the manual acceleration travel. As a result, to produce a desirable outcome, the automatic acceleration travel and the manual acceleration travel may have to use a different one of the two adaptation methods, which are the adaption through reinforcement learning during traveling of the vehicle and the adaption through a conventional method prior to shipping of the vehicle. Accordingly, when the internal combustion engine of this type of vehicle is equipped with the above-described controller, the switching process preferably switches between the first operation process and the second operation process depending on whether the vehicle is performing the manual acceleration travel or the automatic acceleration travel.

In another general aspect, a control method for an internal combustion engine mounted on a vehicle is provided. The method changes a controlled variable of the internal combustion engine by operating an operated unit of the internal combustion engine. The method includes: storing, in advance, a relationship defining data set that defines a relationship between a state variable that represents a state of the vehicle, which includes a state of the internal combustion engine, and an operated amount of the operated unit, the relationship defining data set being updated during traveling of the vehicle; storing, in advance, an adapted data set that is used to calculate the operated amount based on a detected value of the state variable, the adapted data set not being updated during traveling of the vehicle; and executing an operation of the operated unit. The executing the operation of the operated unit includes executing: a first calculation process that uses the adapted data in order to calculate the operated amount on a basis of the detected value of the state variable; a second calculation process that calculates, as the operated amount, a value that is determined by the relationship defining data set and the state variable; a reinforcement learning process that calculates a reward on a basis of the detected value of the state variable when the operated unit is being operated by the operated amount calculated by the second calculation process, and updates the relationship defining data set so as to increase an expected return of the reward on a basis of the state variable, the operated amount, and the reward; a first operation process that executes the first calculation process, and operates the operated unit in accordance with a calculated value of the operated amount by the first calculation process; a second operation process that executes both of the first calculation process and the second calculation process, and operates the operated unit in accordance with a calculated value of the operated amount by the second calculation process; and a switching process that switches a process that operates the operated unit between the first operation process and the second operation process in accordance with the state of the vehicle.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A controller 70 for an internal combustion engine 10 according to an embodiment will now be described with reference to FIGS. 1 to 7B.

Figure 1:
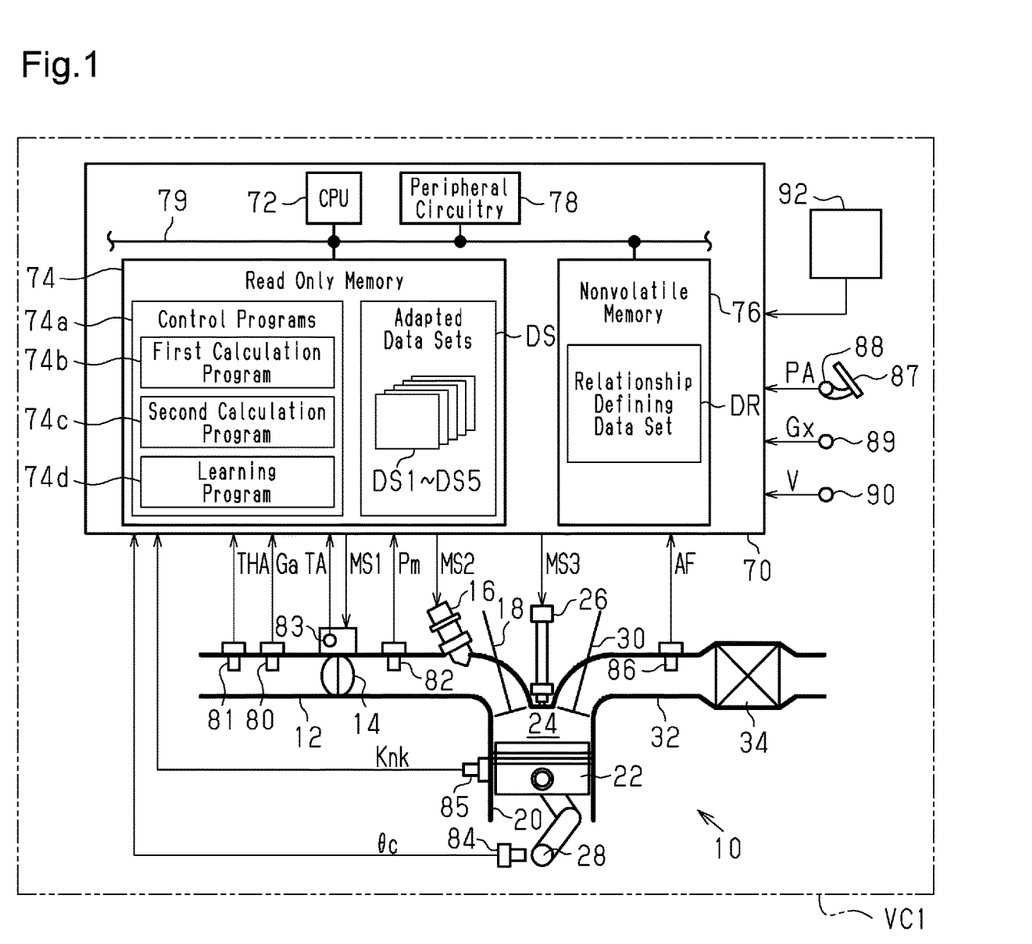
FIG. 1 is a schematic diagram showing a controller for an internal combustion engine according to a first embodiment.

FIG. 1 shows the configuration of the controller 70 of the present embodiment and the internal combustion engine 10 mounted on a vehicle VC1. The controller 70 controls the internal combustion engine 10. The internal combustion engine 10 includes an intake passage 12, in which a throttle valve 14 and a fuel injection valve 16 are arranged in that order from the upstream side. Air drawn into the intake passage 12 and fuel injected from the fuel injection valve 16 flow into a combustion chamber 24, which is defined by a cylinder 20 and a piston 22, when an intake valve 18 is opened. The air-fuel mixture is burned by spark discharge of an ignition device 26 in the combustion chamber 24, and the energy generated by the combustion is converted into rotational energy of a crankshaft 28 via the piston 22. The burned air-fuel mixture is discharged to an exhaust passage 32 as exhaust gas when an exhaust valve 30 is opened. The exhaust passage 32 incorporates a catalyst 34, which is an aftertreatment device for purifying exhaust gas.

The controller 70 operates operated units of the internal combustion engine 10 such as the throttle valve 14, the fuel injection valve 16, and the ignition device 26, thereby controlling parameters such as the torque and the ratios of exhaust components, which are controlled variables indicating the state of the internal combustion engine 10. FIG. 1 shows operation signals MS1 to MS3 respectively corresponding to the throttle valve 14, the fuel injection valve 16, and the ignition device 26.

The controller 70 obtains detected values of various sensors that detect the state of the internal combustion engine 10 in order to control the controlled variables of the internal combustion engine 10. The sensors that detect the state of the internal combustion engine 10 include an air flow meter 80 which detects an intake air amount Ga an intake air temperature sensor 81, which detects an intake air temperature THA, an intake pressure sensor 82, which detects an intake pressure Pm, a throttle sensor 83, which detects a throttle opening degree TA of the throttle valve 14, and a crank angle sensor 84, which detects a rotational angle θc of a crankshaft 28. The sensors also include a knock sensor 85, which outputs a knock signal Knk indicating the occurrence of knocking in the combustion chamber 24, and an air-fuel ratio sensor 86, which detects an air-fuel ratio AF of the air-fuel mixture that has been burned in the combustion chamber 24. The controller 70 also refers to detected values of sensors that detect the state of the vehicle VC1, such as an accelerator pedal sensor 88, which detects an accelerator operated amount PA, or the amount of depression of an accelerator pedal 87, an acceleration sensor 89, which detects an acceleration Gx in the front-rear direction of the vehicle VC1, and a vehicle speed sensor 90, which detects a vehicle speed V.

Further, the vehicle VC1 includes an operation panel 92, which switches the traveling mode between a manual acceleration travel and an automatic acceleration travel and/or changes a target speed of the automatic acceleration travel. The manual acceleration travel is a traveling mode in which the vehicle VC1 is accelerated or decelerated in response to operation of the accelerator pedal 87 by the driver. The automatic acceleration travel is a traveling mode that is not based on the operation of the accelerator pedal 87. That is, in the automatic acceleration travel, the vehicle VC1 is automatically accelerated or decelerated so that the vehicle speed V is maintained at the target speed regardless of the operation of the accelerator pedal 87. When controlling the controlled variables of the internal combustion engine 10, the controller 70 refers to the value of a mode variable MV, which indicates which of the manual acceleration travel and the automatic acceleration travel is being selected as the traveling mode of the vehicle VC1.

Switching from the manual acceleration travel to the automatic acceleration travel is permitted when a target speed is set, and a starting operation for cruise control is performed on the operation panel 92 in a state where predetermined cruise control permitting conditions are satisfied. The cruise control permitting conditions include a condition where the vehicle VC1 is traveling on a limited-access road, and a condition where the vehicle speed V is in a predetermined range.

Switching from the automatic acceleration travel to the manual acceleration travel is executed when the driver presses the brake pedal and/or performs a cruise control canceling operation on the operation panel 92.

The controller 70 includes a CPU 72 and peripheral circuitry 78. The CPU 72 is an execution device that executes processes related to control of the internal combustion engine 10. The peripheral circuitry 78 includes a circuit that generates a clock signal regulating internal operations, a power supply circuit, and a reset circuit. The controller 70 includes, as memory devices, a read-only memory 74, in which stored data cannot be rewritten during traveling of the vehicle VC1, and a nonvolatile memory 76, in which stored data can be electrically rewritten during traveling of the vehicle VC1. The CPU 72, the read-only memory 74, the nonvolatile memory 76, and the peripheral circuitry 78 are allowed to communicate with one another through a local network 79.

The read-only memory 74 stores control programs 74a for controlling the internal combustion engine 10. The control programs 74a include two programs: a first calculation program 74b and a second calculation program 74c, which are used to calculate operated amounts of operated units of the internal combustion engine 10. The read-only memory 74 also stores multiple adapted data sets DS, which are used in calculation of the of the operated amounts with the first calculation program 74b. The nonvolatile memory 76 stores a relationship defining data set DR, which defines the relationship between the state of the vehicle VC1 and operated amounts. The relationship defining data set DR is used in calculation of the operated amounts with the second calculation program 74c. The read-only memory 74 stores a learning program 74d, which is a program for updating the relationship defining data set DR.

The adapted data sets DS include various types of mapping data used in calculation of the operated amounts of the operated units of the internal combustion engine 10. The mapping data includes combinations of discrete values of input variables and values of output variables each corresponding to a value of the input variables. The mapping data includes a mapping data set DS1 for calculating requested torque, a mapping data set DS2 for calculating an opening degree, a mapping data set DS3 for calculating basic injection timing, and a mapping data set DS4 for calculating retardation limit ignition timing. The mapping data set DS1 for calculating a requested torque uses the accelerator operated amount PA and the vehicle speed V as input variables, and outputs an output variable that is a requested torque Tor*, which is a requested value of the torque of the internal combustion engine 10. The mapping data set DS2 for calculating an opening degree uses the torque of the internal combustion engine 10 as an input variable, and outputs an output variable that is a value of the throttle opening degree TA required to generate the torque. The mapping data set DS3 for calculating basic injection timing uses an engine rotation speed NE and an intake air amount KL as input variables, and outputs an output variable that is a basic ignition timing Abse. The basic ignition timing Abse is the more retarded one of the optimum ignition timing, which is an ignition timing at which the torque of the internal combustion engine 10 is maximized, and a trace-knock ignition timing, which is the advancement limit of the ignition timing that can suppress knocking. The mapping data set DS4 for calculating retardation limit ignition timing uses the engine rotation speed NE and the intake air amount KL as input variables, and outputs an output variable that is retardation limit ignition timing Akmf. The retardation limit ignition timing Akmf is a retardation limit of the range of the ignition timing Ak in which combustion of air-fuel mixture in the combustion chamber 24 does not deteriorate.

The adapted data sets DS include a model data set DS5 for calculating an intake air amount. The model data set DS5 is the data of a physical model of the behavior of the intake air of the internal combustion engine 10, which is used to calculate the intake air amount KL flowing into the combustion chamber 24. The model data set DS5 is configured to output the intake air amount KL in accordance with input parameters such as the intake air amount Ga, the intake air temperature THA, the intake pressure Pm, the throttle opening degree TA, and the engine rotation speed NE.

The mapping data sets DS1 to DS4 and the model data set DS5 are adapted in advance such that operated amounts that are calculated using these data sets satisfy requirements such as the exhaust characteristics of the internal combustion engine 10, the fuel consumption rate, and the driver comfort. The mapping data sets DS1 to DS4 and the model data set DS5 are written in the read-only memory 74 prior to shipping of the vehicle VC1, and can be updated only by using dedicated equipment installed in maintenance facility. That is, the adapted data sets DS are not updated during traveling of the vehicle VC1.

Figure 2:
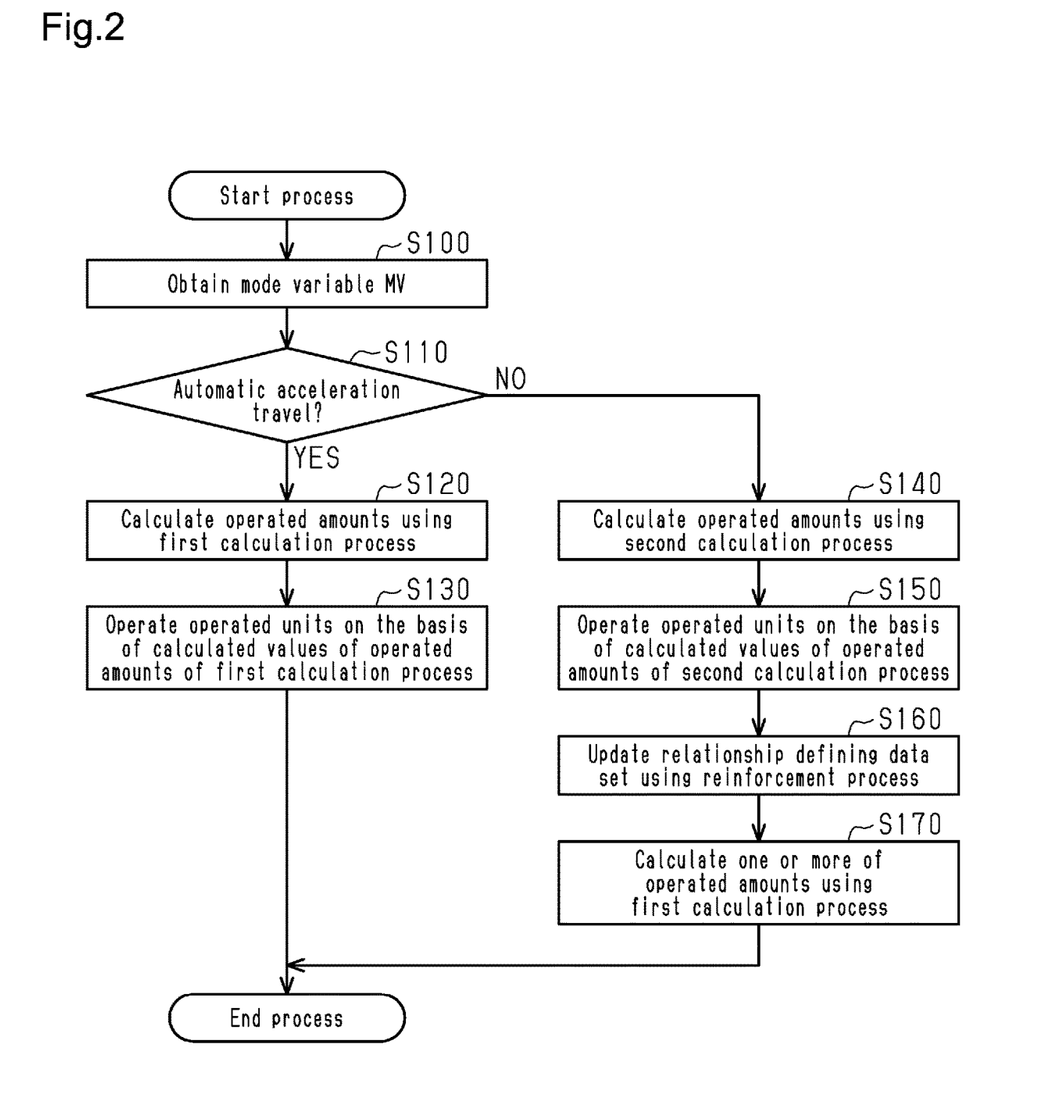
FIG. 2 is a flowchart showing a process executed by an execution device of the controller.

FIG. 2 shows the procedure of processes related to operations of operated units of the internal combustion engine 10 executed by the controller 70 according to the present embodiment. The processes shown in FIG. 2 are implemented by the CPU 72 repeatedly executing the control programs 74a stored in the read-only memory 74 at predetermined control cycles. In the following description, the number of each step is represented by the letter S followed by a numeral. In the present embodiment, depending on whether the vehicle VC1 is performing the manual acceleration travel or the automatic acceleration travel, switching process is executed by the process of FIG. 2 in order to switch between operations of the operated units with operated amounts calculated by a first calculation process or operations of the operated units with operated amounts calculated by a second calculation process.

When the series of processes shown in FIG. 2 is started, the CPU 72 first obtains the value of the mode variable MV in step S100. Subsequently, the CPU 72 determines whether the traveling mode of the vehicle VC1, which is indicated by the value of the mode variable MV, is the automatic acceleration travel in step S110.

When the traveling mode of the vehicle VC1 is the automatic acceleration travel (S110: YES), the CPU 72 proceeds to step S120. In step S120, the CPU 72 executes the first calculation process that calculates operated amounts of the operated units of the internal combustion engine 10 using the first calculation program 74b. In the subsequent step S130, the CPU 72 operates the operated units of the internal combustion engine 10 on the basis of the calculated values of the operated amounts in the first calculation process. The CPU 72 then temporarily suspends the processes shown in FIG. 2.

When the traveling mode of the vehicle VC1 is the manual acceleration travel (S110: NO), the CPU 72 proceeds to step S140. In step S140, the CPU 72 executes the second calculation process, which calculates the operated amounts of the operated units of the internal combustion engine 10 using the second calculation program 74c. In the subsequent step S150, the CPU 72 operates the operated units of the internal combustion engine 10 in accordance with the calculated values of the operated amounts in the second calculation process. Further, in the subsequent step S160, the CPU 72 executes a reinforcement learning process, which updates the relationship defining data set DR using the learning program 74d. In the subsequent step S170, the CPU 72 calculates the operated amounts of one or more of the operated units of the internal combustion engine 10 using the first calculation process. The CPU 72 then temporarily suspends the processes shown in FIG. 2.

As described above, during the automatic acceleration travel, the CPU 72 executes an operation process of the internal combustion engine 10 to operate the operated units with the operated amounts calculated by the first calculation process. Also, during the manual acceleration travel, the CPU 72 executes an operation process of the internal combustion engine 10 to operate the internal combustion engine 10 with the operated amount calculated by the second calculation process, and to calculate one or more of the operated amounts using the first calculation process. In the following description, the operation process executed during the automatic acceleration travel will be referred to as a first operation process, and the operation process executed during the manual acceleration travel will be referred to as a second operation process. That is, the processes of steps S120 and S130 in FIG. 2 correspond to the first operation process. The processes of steps S140, S150, and S170 in FIG. 2 correspond to the second operation process.

The calculation of the operated amounts of the operated units of the internal combustion engine 10 in the first calculation process will now be described. In the first calculation process, the operated amounts of the operated units of the internal combustion engine 10 are calculated using the adapted data sets DS, which are stored in the read-only memory 74 in advance. In this example, the manner in which three operated amounts of operated units of the internal combustion engine 10 are calculated by the first calculation process will be described. The three operated amounts are an opening degree command value TA*, which is the operated amount of the throttle valve 14, an injection amount command value Qi, which is the operated amount of the fuel injection valve 16, and an ignition timing command value Aop, which is the operated amount of the ignition device 26. In the present embodiment, the opening degree command value TA*, the injection amount command value Qi, and the ignition timing command value Aop are calculated in step S120 of FIG. 2. In contrast, only the opening degree command value TA* and the injection amount command value Qi are calculated in step S170 of FIG. 2.

Figure 3:
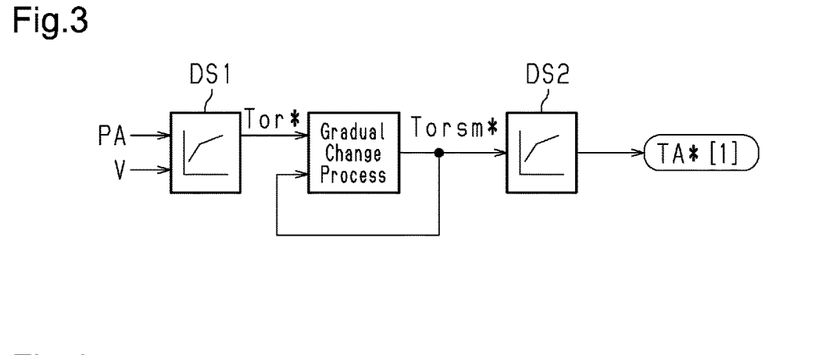
FIG. 3 is a block diagram showing flows of processes related to calculation of an opening degree command value in the first calculation process executed by the controller.

FIG. 3 shows a procedure of processes related to the calculation of the opening degree command value TA* in the first calculation process. In the following description, the calculated value of the opening degree command value TA* by the first calculation process will be represented by TA*[1], and the calculated value of the opening degree command value TA* by the second calculation process will be represented by TA*[2].

When the opening degree command value TA*[1] is calculated in the first calculation process, the output of the mapping data set DS1, which uses the accelerator operated amount PA and the vehicle speed V as inputs, is calculated as the value of the requested torque Tor* as shown in FIG. 3. In the calculation of the opening degree command value TA*[1] during the automatic acceleration travel, that is, in step S120 of FIG. 2, the actual operated amount of the accelerator pedal (i.e. depression) by the driver is not used as the accelerator operated amount PA, which is an input to the mapping data set DS1. Instead, the first calculation process uses a virtual accelerator operated amount that is obtained by converting a required amount of acceleration/deceleration of the vehicle VC1 necessary to maintain the vehicle speed V at a target speed into an operated amount of the accelerator pedal.

Subsequently, a value obtained by subjecting the requested torque Tor* to the gradual change process is calculated as a requested torque gradual change value Torsm*. The gradual change process is a filtering process that uses the requested torque Tor* as an input, and outputs a value that follows the requested torque Tor* with a delay as the requested torque gradual change value Torsm*. The present embodiment employs, as the gradual change process, a filtering process that outputs a moving average of the requested torque Tor* as the requested torque gradual change value Torsm*. When the throttle opening degree TA changes abruptly, the gradual change process suppresses impairment of the driver comfort due to an abrupt change in the engine rotation speed NE or deterioration of the exhaust characteristics due to a response delay of the air intake. In the first calculation process, an output of the mapping data set DS2, which uses the requested torque gradual change value Torsm* as an input, is calculated as the value of an opening degree command value TA*[1], which is a command value of the throttle opening degree TA.

When the first calculation process is executed in step S120 of FIG. 2 during the automatic acceleration travel of the vehicle VC1, the command signal MS1 is output to the throttle valve 14 in the subsequent step S130. The command signal MS1 instructs a change of the throttle opening degree TA to the opening degree command value TA*[1]. When the first calculation process is executed in step S170 of FIG. 2 during the manual acceleration travel of the vehicle VC1, the opening degree command value TA*[1] is calculated in step S170, but the calculation result is not used in the actual operation of the throttle valve 14.

Figure 4:
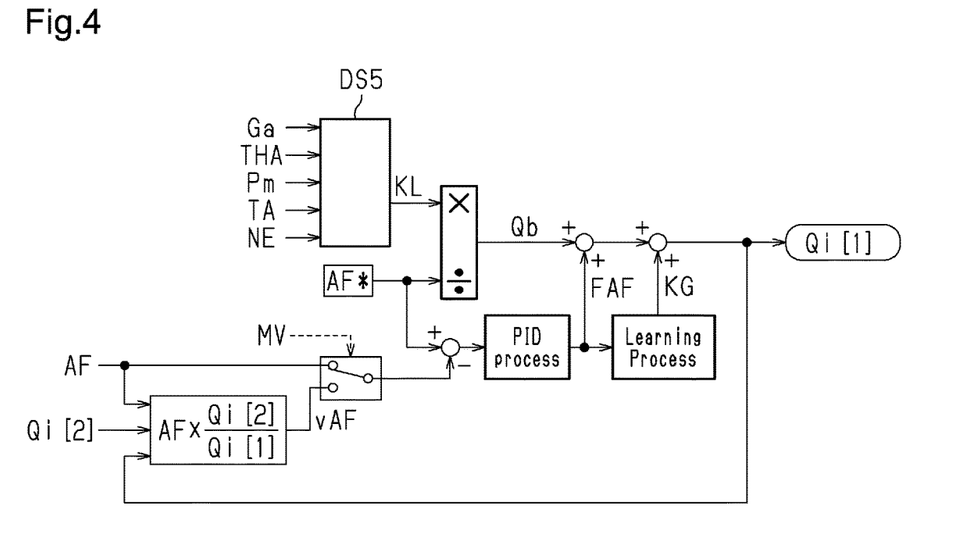
FIG. 4 is a block diagram showing flows of processes related to calculation of an injection amount command value in the first calculation process executed by the controller.

FIG. 4 shows a procedure of processes of the CPU 72 related to the calculation of the injection amount command value Qi in the first calculation process. In the following description, the calculated value of the injection amount command value Qi by the first calculation process will be represented by Qi[1], and the calculated value of the injection amount command value Qi by the second calculation process will be represented by Qi[2].

When the injection amount command value Qi[1] is calculated in the first calculation process, the model data set DS5 uses, as inputs, parameters such as the intake air amount Ga, the intake air temperature THA, the intake pressure Pm, the throttle opening degree TA, and the engine rotation speed NE as shown in FIG. 4. The output of the model data set DS5 is calculated as the value of the intake air amount KL. The intake air amount KL is divided by a target air-fuel ratio AF*, which is a target value of the air-fuel ratio of the air-fuel mixture burned in the combustion chamber 24, and the quotient is calculated as the value of a basic injection amount Qb.

At the calculation of the injection amount command value Qi[1], an air-fuel ratio feedback correction value FAF is calculated. At the calculation of the injection amount command value Qi[1] during the automatic acceleration travel, that is, in step S120 of FIG. 2, the air-fuel ratio feedback correction value FAF is calculated in accordance with the deviation of the detected value of the air-fuel ratio AF from the target air-fuel ratio AF*. In contrast, at the calculation of the injection amount command value Qi[1] during the manual acceleration travel, that is, in step S150 of FIG. 2, the air-fuel ratio feedback correction value FAF is calculated in accordance with the deviation of the virtual air-fuel ratio vAF from the target air-fuel ratio AF*. The virtual air-fuel ratio vAF is a value that satisfies the relationship represented by the following expression (1) in relation to the values in the previous control cycle of the detected value of the air-fuel ratio AF, the injection amount command value Qi[1] by the first calculation process, and the injection amount command value Qi[2] by the second calculation process. The virtual air-fuel ratio vAF is the value of the air-fuel ratio AF when it is assumed that the fuel injection valve 16 is operated in accordance with the injection amount command value Qi[1] calculated by the first calculation process, instead of being operated in accordance with the injection amount command value Qi[2] calculated by the second calculation process.

$$vAF=(Qi[2]/Qi[1])\times AF \quad (1)$$

In the present embodiment, the calculation of the air-fuel ratio feedback correction value FAF is executed by a PID process. That is, the sum of a proportional term, an integral term and a derivative term which are shown below is calculated as the value of the air-fuel ratio feedback correction value FAF. The proportional term is a product obtained by multiplying the deviation of the air-fuel ratio AF or the virtual air-fuel ratio vAF from the target air-fuel ratio AF* by a predetermined proportional gain. The integral term is a product obtained by multiplying the time integral of the deviation by a predetermined integral gain. The derivative term is a product obtained by multiplying the time derivative of the deviation by a predetermined derivative gain.

When the injection amount command value Qi[1] is calculated by the first calculation process, a learning process of an air-fuel ratio learning value KG is executed. The learning process of the air-fuel ratio learning value KG is executed by updating the value of the air-fuel ratio learning value KG in the manner described in the items (1) to (3) below, on the basis of the value of the air-fuel ratio feedback correction value FAF in a steady operation of the internal combustion engine 10, in which the engine rotation speed NE and the intake air amount KL are stable. (1) When the absolute value of the air-fuel ratio feedback correction value FAF is less than a predetermined update determination value, the value of the air-fuel ratio learning value KG is maintained. (2) When the air-fuel ratio feedback correction value FAF is a positive value and the absolute value is greater than or equal to the predetermined update determination value, the value of the air-fuel ratio learning value KG is updated to a difference obtained by subtracting a predetermined update amount from the air-fuel ratio learning value KG before the update. (3) When the air-fuel ratio feedback correction value FAF is a negative value and the absolute value is greater than or equal to the predetermined update determination value, the value of the air-fuel ratio learning value KG is updated to a sum obtained by adding the predetermined update amount to the air-fuel ratio learning value KG before the update.

In the first calculation process, the sum of the basic injection amount Qb, the air-fuel ratio feedback correction value FAF, and the air-fuel ratio learning value KG is calculated as the value of the injection amount command value Qi. When the first calculation process is executed in step S120 of FIG. 2 during the automatic acceleration travel of the vehicle VC1, the injection amount command value Qi[1] is calculated in step S120. In the subsequent step S130, the command signal MS2 is output to the fuel injection valve 16. The command signal MS2 instructs fuel injection of an amount corresponding to the value of the injection amount command value Qi[1]. When the first calculation process is executed in step S170 of FIG. 2 during the manual acceleration travel of the vehicle VC1, the injection amount command value Qi[1] is calculated in step S170, but the calculation result is not used in the actual operation of the fuel injection valve 16.

Figure 5:
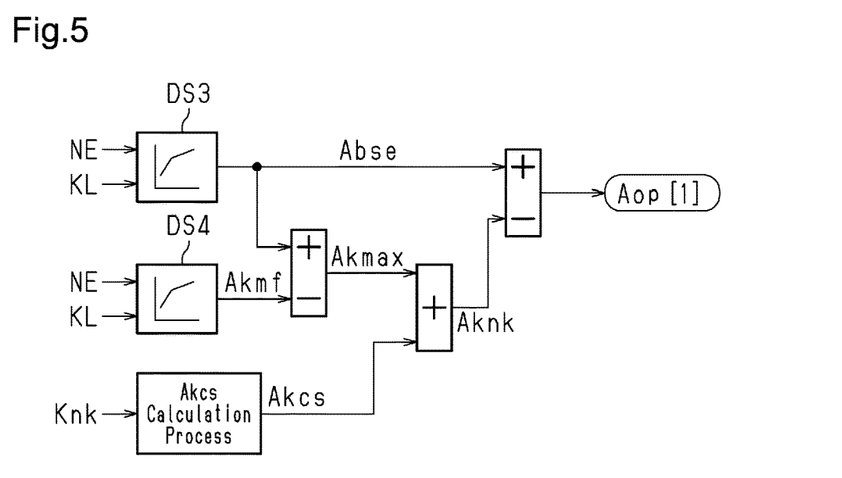
FIG. 5 is a block diagram showing flows of processes related to calculation of an ignition timing command value in the first calculation process executed by the controller.

FIG. 5 shows a procedure of processes of the CPU 72 related to the calculation of the ignition timing command value Aop, which is an operated amount of the ignition device 26 in the first calculation process. In the following description, the calculated value of the ignition timing command value Aop by the first calculation process will be represented by Aop[1], and the calculated value of the ignition timing command value Aop by the second calculation process will be represented by Aop[2].

When the ignition timing command value Aop[1] is calculated in the first calculation process, an output of the mapping data set DS3, which uses the engine rotation speed NE and the intake air amount KL as inputs, is calculated as the basic ignition timing Abse. An output of the mapping data set DS4, which uses the engine rotation speed NE and the intake air amount KL as inputs, is calculated as a value of the retardation limit ignition timing Akmf. Then, a difference obtained by subtracting the retardation limit ignition timing Akmf from the basic ignition timing Abse is calculated as a value of a maximum retardation amount Akmax.

When the ignition timing command value Aop[1] is calculated in the first calculation process, a calculation process of a knock control amount Akcs based on the knock signal Knk is executed. The calculation of the knock control amount Akcs is executed by updating the value of the knock control amount Akcs in the manners described in the following items (4) and (5). (4) When the knock signal Knk has a value that indicates the occurrence of knocking, the knock control amount Akcs is updated to a sum obtained by adding a predetermined knock retardation amount to the value prior to the update. (5) When the knock signal Knk has a value that indicates that knocking is not occurring, the knock control amount Akcs is updated to a difference obtained by subtracting a predetermined knock advancement amount from the value prior to the update. The knock retardation amount is set to a positive value, and the knock advancement amount is set to a value larger than the knock retardation amount.

Then, a sum obtained by adding the knock control amount Akcs to the maximum retardation amount Akmax is calculated as a value of an ignition timing retardation amount Aknk. A difference obtained by subtracting the ignition timing retardation amount Aknk from the basic ignition timing Abse is calculated as a value of the ignition timing command value Aop[1].

As described above, the calculation of the ignition timing command value Aop[1] in the first calculation process is executed only during the automatic acceleration travel. That is, the ignition timing command value Aop[1] is calculated in the first calculation process in step S120 of FIG. 2 when the vehicle VC1 is performing the automatic acceleration travel. However, the ignition timing command value Aop[1] is not calculated in the first calculation process in step S170 of FIG. 2 when the vehicle VC1 is performing the manual acceleration travel. In step S130 of FIG. 2, the command signal MS3 is output to the ignition device 26. The command signal MS3 instructs execution of ignition at timing that corresponds to the ignition timing command value Aop[1], which is calculated in step S120.

Calculation of operated amounts by the second calculation process in steps S140 to S160 of FIG. 2 during the manual acceleration travel of the vehicle VC1, operation of the operated units in accordance with the calculated values, and a series of processes related to the reinforcement learning will now be described. In the second calculation process, the operated units of the internal combustion engine 10 are operated in accordance with operated amounts that are determined by the relationship defining data set DR stored in the nonvolatile memory 76 and the state of the vehicle VC1.

In the present embodiment, the relationship defining data set DR is used to define an action value function Q and a policy J. The action value function Q is a table-type function representing values of an expected return in accordance with respective independent variables of a state s and an action a. In the present embodiment, the state s is determined on the basis of eight variables: the engine rotation speed NE, the intake air amount KL, the intake air amount Ga, the intake air temperature THA, the intake pressure Pm, the air-fuel ratio AF, the accelerator operated amount PA, and the vehicle speed V. Also, in the present embodiment, the action a is determined on the basis of three variables that are operated amounts of operated units of the internal combustion engine 10: the opening degree command value TA*[2], the injection amount command value Qi[2], and the ignition timing command value Aop[2]. That is, the state s is an eight-dimensional vector, and the action a is a three-dimensional vector. The action value function Q(s, a) of the present embodiment is a table-type function.

Figure 6:
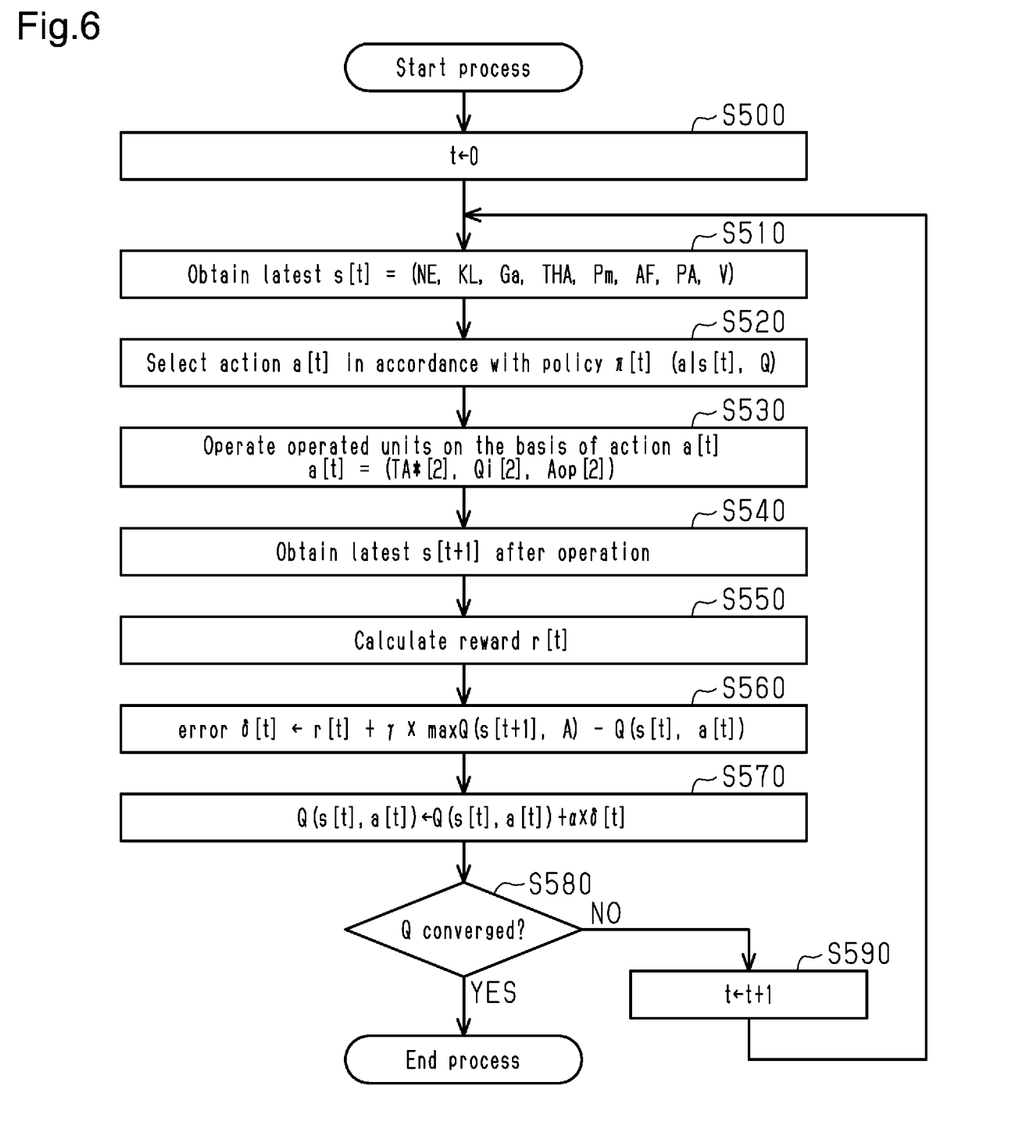
FIG. 6 is a flowchart showing a procedure of processes of a second calculation process and a reinforcement learning process executed by the controller.

FIG. 6 shows a procedure of processes of the CPU 72 related to the second calculation process and the reinforcement learning process. The series of processes in FIG. 6 corresponds to the processes of steps S140 to S160 in FIG. 2. That is, the processes of steps S510 to S520 of FIG. 6 correspond to the processes executed by the CPU 72 in step S140 of FIG. 2. The process of step S530 in FIG. 6 corresponds to the process executed by the CPU 72 in step S150 of FIG. 2. The processes of steps S540 to S590 in FIG. 6 correspond to the process executed by the CPU 72 in step S160 of FIG. 2.

When the series of processes of FIG. 6 is started, the value of t is reset to 0 in step S500. Subsequently, in step S510, the latest state s of the vehicle VC1 is acquired, and the values of the variables of the acquired state s are assigned to the variables of a state s[t]. Next, in step S520, an action a[t] is selected in accordance with a policy π[t], which is defined by the relationship defining data set DR. The action a[t] refers to an action a that is selected for the state s[t]. In the state s[t], the policy π[t] maximizes the probability of selecting an action c that maximizes the action value function Q(s[t], a), that is, a greedy action, without causing the selection probability of other actions a to become 0. Since there are cases where a greedy action is not selected, a search for an optimum action is possible. The policy π is implemented by an ε greedy action selection method and/or a Softmax action selection method. In the subsequent step S530, the operation signals MS1 to MS3 are respectively output to the throttle valve 14, the fuel injection valve 16, and the ignition device 26 in accordance with the opening degree command value TA*[2], the injection amount command value Qi[2], and the ignition timing command value Aop[2], which have been selected as the action a[t].

Thereafter, the reward calculating process is executed in steps S540 and S550. In the reward calculating process, the latest state s after operations of the operated units corresponding to the action a[t] is performed is acquired. The values of variables of the acquired state s are assigned to the values of the variables of a state s[t+1] in step S540. In the subsequent step S550, a reward r[t] by the action a[t] is calculated on the basis of the state s[t+1]. The reward r[t] is calculated as a sum of multiple rewards of different factors including: a reward related to the exhaust characteristics of the internal combustion engine 10 that is obtained, for example, from an integrated value of the deviation of the air-fuel ratio AF from the target air-fuel ratio AF*; a reward related to the fuel consumption rate of the internal combustion engine 10 that is obtained, for example, from an integrated value of the injection amount command value Qi; and a reward related to the driver comfort that is obtained, for example, from an integrated value of the acceleration Gx.

Subsequently, in step S560, an error δ[t] is calculated. The error δ[t] is used to calculate an update amount that updates the value of the action value function Q(s[t], a[t]) in a case of the state s[t] and the action a[t], among the values of the action value function Q. In the present embodiment, the error δ[t] is calculated using an off-policy temporal difference (TD) method. That is, the maximum value of the action value function Q(s[t+1], A) is multiplied by a discount factory. The sum of the product and the reward r[t] is obtained. The action value function Q(s[t], a[t]) is subtracted from the sum, and the resultant is used as the error δ[t]. The symbol A represents a set of the actions a. Next, in step S570, the error δ[t] is multiplied by a learning rate a, and the product is added to the action value function Q(s[t], a[t]) in order to update the action value function Q(s[t], a[t]). That is, the values of the action value function Q(s, a), which is defined by the relationship defining data set DR, include a value in which the independent variables are the state s[t] and the action a[t], and that value is changed by α·δ[t]. Through the processes of steps S560 and S570, the relationship defining data set DR is updated so as to increase the expected return of the reward r[t]. This is because the action value function Q(s[t], a[t]) is updated to become a value that highly accurately represents the actual expected return.

In the subsequent step S580, it is determined whether the value of the action value function Q of each independent variable has converged. If it is determined that convergence has not occurred (NO), the value of t is increased by 1 in step S590, and the process returns to step S530. If it is determined that the value of the action value function Q has converged (S580: YES), the series of processes shown in FIG. 6 is temporarily suspended.

An operation and advantages of the present embodiment will now be described.

The controller 70 of the present embodiment has the first calculation process and the second calculation process as processes that calculate operated amounts of operated units of the internal combustion engine 10. In the first calculation process, the operated amounts are calculated using the adapted data sets DS, which are stored in the read-only memory 74 in advance. The adapted data sets DS, which are used in calculation of the operated amounts in the first calculation process, must be adapted before shipping of the vehicle VC1.

The second calculation process calculates the operated amounts of the operated units, which are determined by the relationship defining data set DR stored in the nonvolatile memory 76 and the state of the vehicle VC1. During the execution of the second operation process, the reward r is calculated from the state of the vehicle VC1, which changes as the result of operations of the operated units on the basis of the calculated values of the operated amounts by the second calculation process. Also, the relationship defining data set DR is updated such that the expected return of the reward r is increased. That is, during the operations of the operated units of the internal combustion engine 10 using the calculated values by the second calculation process, adaptation of the operated amounts is advanced through the reinforcement learning. In this manner, the operated amounts are adapted through the reinforcement learning during traveling of the vehicle VC1. This reduces the number of man-hours of skilled workers required to adapt the operated amounts prior to the shipping of the vehicle VC1. However, the adaptation of the operated amounts through the reinforcement learning during traveling of the vehicle VC1 increases the calculation load on the controller 70. Thus, although adaptation of the operated amounts through the reinforcement learning during traveling of the vehicle VC1 is advantageous in reduction of the number of man-hours of skilled workers required to adapt the operated amounts, such a configuration is disadvantageous because it increases the calculation load on the controller 70. Also, it takes a certain amount of time for the operated amounts to be adapted through the reinforcement learning. This may reduce the controllability of the internal combustion engine 10 until the adaptation is completed.

The controller 70 of the present embodiment is used for the internal combustion engine 10 mounted on the vehicle VC1, which performs the manual acceleration travel and the automatic acceleration travel. In the manual acceleration travel, the vehicle VC1 is accelerated or decelerated in response to an operation of the accelerator pedal 87 by the driver. In the automatic acceleration travel, the vehicle VC1 is automatically accelerated or decelerated regardless of an operation of the accelerator pedal 87. The state of the vehicle VC1 varies between the manual acceleration travel and the automatic acceleration travel. Thus, the adaptation of the operated amounts must be performed separately. The automatic acceleration travel of the vehicle VC1 is performed only when the driver selects the automatic acceleration travel while traveling on a limited-access road. Accordingly, the automatic acceleration travel may be performed less frequently than the manual acceleration travel. Thus, if the adaptation of the operated amounts during the automatic acceleration travel is performed through the reinforcement learning, a state in which the adaptation is incomplete may have a long duration.

In the present embodiment, for the manual acceleration travel, which is expected to be performed relatively frequently, the operated amounts are adapted through the reinforcement learning during traveling of the vehicle VC1. On the other hand, for the automatic acceleration travel, which is expected to be performed less frequently, the operated amounts are adapted by a conventional method. In the present embodiment, although the operated amounts need to be adapted by a conventional method for the automatic acceleration travel, the number of man-hours of skilled workers required to perform the adaptation is reduced as compared to a case in which the adaptation of the operated amounts is performed by a conventional method for both of the manual acceleration travel and the automatic acceleration travel.

When the opening degree command value TA* of the throttle valve 14 is calculated by the first calculation process as described above, the gradual change process is executed that uses the requested torque Tor* as an input, and outputs a value that follows the requested torque Tor* with a delay as the requested torque gradual change value Torsm*. An output of the mapping data set DS2, which uses the requested torque gradual change value Torsm* as an input, is calculated as the value of the opening degree command value TA*[1].

Figure 7A:
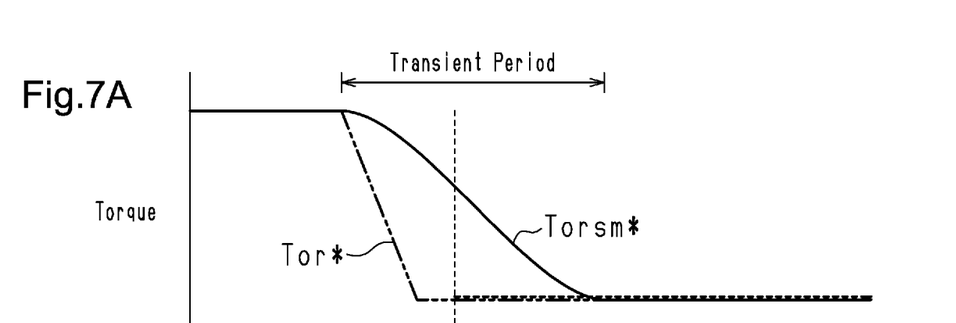
FIG. 7A is a timing diagram showing changes in a requested torque and a gradual change value.
Figure 7B:
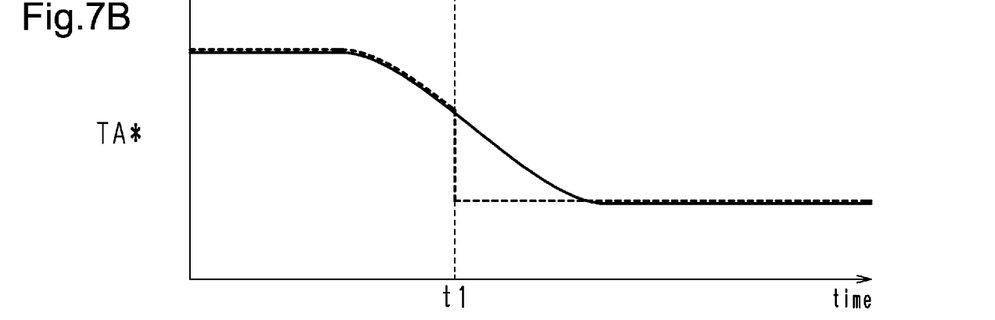
FIG. 7B is a timing diagram showing changes in the opening degree command value.

In FIG. 7A, the long-dash double-short-dash line represents an abrupt drop of the requested torque Tor*, and the solid line represents a corresponding change in the requested torque gradual change value Torsm*. In FIG. 7B, the solid line represents a corresponding change in the opening degree command value TA*[1]. The opening degree command value TA*[1] is calculated as a value that changes after a delay from a change in the requested torque Tor*. In the first calculation process, the gradual change process limits deterioration of the exhaust characteristics of the internal combustion engine 10 due to a response delay of the intake air and a reduction in the driver comfort due to an abrupt change in the engine rotation speed NE.

In contrast, the second calculation process uses the state s of the vehicle VC1 as an input to the relationship defining data set DR, and calculates the operated amounts of the operated units of the internal combustion engine 10 as outputs of the relationship defining data set DR. The adaptation of the operated amounts by the second calculation process is performed through the reinforcement learning based on the reward r, which is calculated from a view point of the exhaust characteristics of the internal combustion engine 10 and the driver comfort. If the adaptation through the reinforcement learning is performed properly, the opening degree command value TA*[2] of the second calculation process is calculated as a value that changes after a delay from a change in the requested torque Tor*, like the opening degree command value TA*[1] of the first calculation process. In the following description, a transient period refers to a period during which the opening degree command value TA* is changing from a point in time at which the opening degree command value TA* starts changing in response to a change in the requested torque Tor* to a point in time at which the opening degree command value TA* converges to a value corresponding to the changed requested torque Tor*.

It is now assumed that the vehicle VC1 is switched from the automatic acceleration travel to the manual acceleration travel at a point in time t1 during the transient period shown in FIGS. 7A and 7B, so that the operation of the throttle valve 14 using the opening degree command value TA*[2] of the second calculation process is ended, and the operation of the throttle valve 14 using the opening degree command value TA*[1] of the first calculation process is started. An exemplary case assumes that, until the point in time t1, the calculation of the opening degree command value TA* is executed only by the second calculation process, and the calculation by the first calculation process is started at the point in time t1. In FIGS. 7A and 7B, changes in the requested torque gradual change value Torsm* and the opening degree command value TA* in this case are respectively indicated by dotted lines. In this case, the opening degree command value TA*[2] of the second calculation process is used to operate the throttle valve 14 before the point in time t1, and the opening degree command value TA*[1] of the first calculation process is used to operate the throttle valve 14 after the point in time t1. In this case, since the gradual change process is also started at the point in time t1, changes in the requested torque Tor* before the point in time t are not reflected on the opening degree command value TA*[1] of the first calculation process at the point in time t1. Thus, the opening degree command value TA* changes in a stepwise manner at the switching from the operation using the calculated value of the operated amount of the second calculation process to the operation using the calculated value of the operated amount of the first calculation process. This causes the controllability of the internal combustion engine 10 to deteriorate.

In this regard, the CPU 72 of the present embodiment calculates the opening degree command value TA*[1] using the first calculation process even during the period before the point in time t1, that is, during a period in which the throttle valve 14 is operated using the opening degree command value TA*[2] of the second calculation process. In this case, the opening degree command value TA*[1] at the point in time t1, at which the operation of the throttle valve 14 is started using the opening degree command value TA*[1] of the first calculation process, can be set to a value that reflects changes in the requested torque Tor* before the point in time t1. Thus, the opening degree command value TA* is unlikely to change in a stepwise manner when the calculation process of the operated amount used to operate the operated unit of the internal combustion engine 10 is switched from the second calculation process to the first calculation process.

Further, in the present embodiment, the first calculation process performs the air-fuel ratio feedback correction, that is, correction of the injection amount command value Qi[1] using the air-fuel ratio feedback correction value FAF. The air-fuel ratio feedback correction compensates for the deviation of the air-fuel ratio AF from the target air-fuel ratio AF* due to such individual differences and changes over time of the injection characteristics of the fuel injection valve 16 and the intake characteristics of the internal combustion engine 10. It takes a certain amount of time for the air-fuel ratio feedback correction to cause the air-fuel ratio AF to converge to the target air-fuel ratio AF*. Thus, when the second operation process is ended and the first operation process is started, if the air-fuel ratio feedback correction is started from a state in which the value of the air-fuel ratio feedback correction value FAF is 0, the air-fuel ratio AF temporarily deviates from the target air-fuel ratio AF*. This may cause the exhaust characteristics of the internal combustion engine 10 to deteriorate.

However, in the present embodiment, the calculation of the injection amount command value Qi[1] by the first calculation process is continued during the manual acceleration travel of the vehicle VC1, in which the fuel injection valve 16 is operated using the calculated value of the injection amount command value Qi[2] by the second calculation process. When the injection amount command value Qi[1] of the first calculation process is calculated, the virtual air-fuel ratio vAF is calculated from the detected value of the air-fuel ratio AF and the injection amount command values Qi[1], Qi[2] of the first calculation process and the second calculation process. The value of the virtual air-fuel ratio vAF is the value of the air-fuel ratio AF when it is assumed that the fuel injection valve 16 is operated using the injection amount command value Qi[1] of the first calculation process. The virtual air-fuel ratio vAF is used to calculate the air-fuel ratio feedback correction value FAT in order to calculate the injection amount command value Qi. This causes the air-fuel ratio feedback correction of the injection amount command value Qi[1] in the first calculation process to be continued during the operation of the fuel injection valve 16 using the injection amount command value Qi[2] of the second calculation process. Accordingly, the air-fuel ratio AF is unlikely to deviate from the target air-fuel ratio AF* after the operation using the injection amount command value Qi[2] of the second calculation process is switched to the operation using the injection amount command value Qi[1] of the first calculation process.

In the present embodiment, during the execution of the second operation process, which operates the operated units of the internal combustion engine 10 using the operated amounts calculated by the second calculation process, the calculation of the opening degree command value TA*[1] and the injection amount command value Qi[1] by the first calculation process is continued. However, the calculated values of the opening degree command value TA*[1] and the injection amount command value Qi[1] at this time are not used in the actual operation of the throttle valve 14 and the fuel injection valve 16. Thus, only a simplified adaptation needs to be performed for the values of the opening degree command value TA*[1] and the injection amount command value Qi[1] in the state in which the second operation process is executed, that is, during the manual acceleration travel. Since the calculation of other operated amounts such as the ignition timing command value Aop[1] is not executed during the manual acceleration travel, adaptation of these operated amounts during the manual acceleration travel is not required prior to the shipping of the vehicle VC1. As described above, the controller of the internal combustion engine 10 according to the present embodiment reduces the number of man-hours of skilled workers required to perform adaptation of the operated amounts of the internal combustion engine 10 as compared to a case in which the adaptation is performed prior to shipping of the vehicle VC1 for the operated amounts of both of the automatic acceleration travel and the manual acceleration travel.

The present embodiment has the following advantages.

(1) In the above-described embodiment, adaptation of the operated amounts of the operated units of the internal combustion engine 10 for the manual acceleration travel, which is expected to be performed relatively frequently, is performed through reinforcement learning during traveling of the vehicle VC1. On the other hand, the automatic acceleration travel is expected to be performed less frequently, and the opportunities of the performance of reinforcement learning is thought to be limited during the automatic acceleration travel of the vehicle VC1. Accordingly, adaptation of the operated amounts of the operated units for the automatic acceleration travel is performed by a conventional method. Therefore, the adaptation of the operated amounts for each of the manual acceleration travel and the automatic acceleration travel is performed by a suitable method. Also, the number of man-hours of skilled workers is reduced.

(2) The adaptation of the operated amounts in the manual acceleration travel is performed through the reinforcement learning during traveling of the vehicle VC1. Thus, individual differences and/or changes over time of the internal combustion engine 10 are reflected on the results of the adaptation of the operated amounts of the operated units of the internal combustion engine 10 during the manual acceleration travel. This limits deterioration of the controllability of the internal combustion engine 10 due to such individual differences and/or changes over time.

(3) During the execution of the second operation process, which operates the internal combustion engine 10 using the operated amounts calculated in the second calculation process, the calculation of the opening degree command value TA*[1] of the first calculation process is continued. Thus, the opening degree command value TA* is unlikely to change in a stepwise manner when the second operation process to the first operation process.

(4) During the execution of the second operation process, the calculation of the injection amount command value Qi[1] of the first calculation process is continued. This reduces deterioration of the exhaust characteristics of the internal combustion engine 10 after the second operation process is switched to the first operation process.

The present embodiment may be modified as follows. The present embodiment and the following modifications can be combined as long as the combined modifications remain technically consistent with each other.

Regarding Automatic Acceleration Travel and Manual Acceleration Travel

In the above-described embodiment, the automatic acceleration travel is a traveling mode that automatically accelerates or decelerates the vehicle VC1 so as to maintain the vehicle speed V at the target speed. The present disclosure is not limited to this. The automatic acceleration travel may be a traveling mode that automatically accelerates or decelerates the vehicle VC1 on the basis of detection results of the road on which the vehicle VC1 is traveling, and vehicles and/or pedestrians around the vehicle VC1 Also, in the automatic acceleration travel, at least one of steering and braking of the vehicle VC1 may be performed automatically in addition to acceleration and deceleration of the vehicle VC1. Further, in the manual acceleration travel, at least one of steering and braking of the vehicle VC1 may be performed automatically, while acceleration or deceleration of the vehicle VC1 is performed in response to the operation of the accelerator pedal 87 by the driver.

Regarding Switching Process

In the above-described embodiment, the first operation process is executed during the automatic acceleration travel, and the second operation process is executed during the manual acceleration travel. In a vehicle that is operated to perform mainly the automatic acceleration travel and perform the manual acceleration travel in limited situations, the adaptation of the operated amounts through reinforcement learning during traveling of the vehicle is suitable for the automatic acceleration travel, but is not suitable for the manual acceleration travel in some cases. In such a case, the second operation process may be executed during the automatic acceleration travel, and the first operation process may be executed during the manual acceleration travel.

Further, the operated units that are subject to the switching between the first operation process and the second operation process by the switching process may be limited to some of the operated units of the internal combustion engine, and the remaining operated units may be controlled by the first operation process or the second operation process either in the manual acceleration travel or the automatic acceleration travel.

The operation process may be switched in accordance with states of the vehicle VC1 other than those described above. In some cases, the operational zones of the internal combustion engine 10 include a zone that is not used frequently, such as a high-load high-speed zone. In an operational zone that is not used frequently, the adaptation of the operated amounts through reinforcement learning during traveling of the vehicle VC1 is delayed as compared to other operational zones. Therefore, the internal combustion engine 10 may be configured such that the operated units are operated by the first operation process in an operational zone that is not used frequently, and that the operated units are operated by the second operation process in an operational zone that is used frequently.

Regarding Operated Units of Internal Combustion Engine

The operated units of the internal combustion engine 10 subject to switching between the first operation process and the second operation process may include operated units other than the throttle valve 14, the fuel injection valve 16, and the ignition device 26. For example, the present disclosure may be employed in an internal combustion engine that is provided with an exhaust gas recirculation mechanism, which recirculates some of exhaust gas to intake air, and an EGR valve, which is located in the exhaust gas recirculation mechanism and regulates the recirculated amount of exhaust gas. In this case, the EGR valve may be an operated unit of the internal combustion engine subject to switching between the first operation process and the second operation process. Also, the present disclosure may be employed in an internal combustion engine that is provided with a variable valve actuation mechanism, which varies actuation of the intake valve 18 and/or the exhaust valve 30. In this case, the variable valve actuation mechanism may be an operated unit of the internal combustion engine subject to switching between the first operation process and the second operation process.

Regarding State s

In the above-described embodiment, the state s includes eight parameters: the engine rotation speed NE, the intake air amount KL, the intake air amount Ga, intake air temperature THA, the intake pressure Pm, the air-fuel ratio AF, the accelerator operated amount PA, and the vehicle speed V. However, the present disclosure is not limited to this. One or more of the parameters may be removed from the state s. Alternatively, the state s may include additional parameters that indicate the state of the internal combustion engine 10 or the vehicle VC1.

Regarding Reward r

The calculation of the reward r based on the state s may be performed in a manner different from those in the above-described embodiment. For example, amounts of emission of hazardous constituents in the exhaust, such as nitrogen oxide and fine particulate matter may be obtained, and a reward related to the exhaust characteristics of the internal combustion engine 10 may be calculated on the basis of the amounts of emission. Alternatively, the levels of vibrations and noises in the passenger compartment may be measured, and a reward related to the comfort may be calculated on the basis of the measurement results.

Regarding Action Value Function Q

In the above-described embodiment, the action value function Q is a table-type function. However, the present disclosure is not limited to this. For example, a function approximator may be used as the action value function Q. Also, instead of using the action value function Q, the policy π may be expressed by a function approximator that uses the state s and the action a as independent variables, and uses, as a dependent variable, the probability that the action a will be taken. The policy π may also be updated in accordance with the reward r.

Regarding Update of Relationship Defining Data Set DR

In the above-described embodiment, the relationship defining data set DR is updated by the off-policy TD method. However, the present disclosure is not limited to this. For example, the update may be performed by an on-policy TD method such as a state-action-reward-state-action (SARSA) method. Also, an eligibility trace method may be used as an on-policy update method. Alternatively, the relationship defining data set DR can be updated by a method different from the ones described above, such as a Monte Carlo method.

Regarding Feedback Correction Process

The calculation of the injection amount command value Qi of the fuel injection valve 16 in the first calculation process according to the above-described embodiment is executed through the feedback correction process in accordance with the air-fuel ratio AF. When the operated amounts calculated in the first operation process include, in addition to the injection amount command value Qi, an operated amount that is calculated through the feedback correction process, that operated amount is preferably included in the operated amounts that continue to be calculated by the first calculation process during the second operation process.

The feedback correction process refers to a process that uses one of the state variables of the vehicle VC1 as a controlled variable, calculates the feedback correction value in accordance with the deviation of the detected value of the controlled variable from the target value, and corrects the value of the operated amount calculated using the adapted data sets DS with the feedback correction value.

Regarding Gradual Change Process

The calculation of the opening degree command value TA* of the throttle valve 14 in the first calculation process in the above-described embodiment is executed through the gradual change process. The calculation of the opening degree command value TA* of the first calculation process through the gradual change process is continued during the execution of the second operation process. When the operated amounts that are calculated in the first calculation process include, in addition to the opening degree command value TA*, an operated amount that is calculated through the gradual change process, that operated amount is preferably included in the operated amounts that continue to be calculated by the first calculation process during the second operation process.

The gradual change process refers to the following process. The calculation of the operated amounts in the gradual change process is also executed using adapted data that is stored in the memory device in advance, uses a state variable indicating the state of the vehicle as an input, and defines a map that outputs the operated amounts. The gradual change process is one of two different processes A and B. The process A uses a detected value of a state variable as an input, and outputs, as an input value to the map, a value that changes after a delay in relation to the detected value. The process B uses the output value of the map as an input, and outputs, as a calculated value of the operated amount, a value that changes after a delay in relation to the output value. When the opening degree command value TA* of the throttle valve 14 is calculated in the above-described embodiments, the process A is executed as the gradual change process. However, the process B can be executed as the gradual change process.

Figure 8:
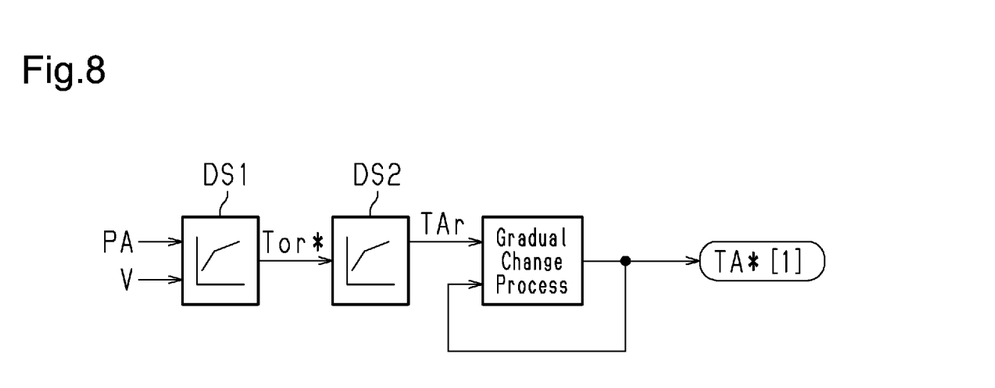
FIG. 8 is a block diagram showing flows of processes of a calculation process of the opening degree command value in a first calculation process according to a modification.

FIG. 8 shows a procedure of processes of the CPU 72 related to the operation of the throttle valve 14 in the first operation process in a case in which the process B is executed as the gradual change process in order to calculate the opening degree command value TA*. When the throttle valve 14 is operated in the first operation process in this case, the output of the mapping data set DS1, which uses the accelerator operated amount PA and the vehicle speed V as inputs, is calculated as the value of the requested torque Tor* as shown in FIG. 8. An output of the mapping data set DS2, which uses the requested torque Tor* as an input, is calculated as the value of the opening degree command value TA*. Further, the value obtained by subjecting the opening degree command value TA* to the gradual change process is calculated as an opening degree gradual change command value TAsm*. A signal outputting process outputs a command signal MS1 to the throttle valve 14. The command signal MS1 instructs a change of the throttle opening degree TA to the opening degree gradual change command value TAsm*.

The operated amounts that continue to be calculated by the first calculation process during the execution of the second operation process are not limited to operated amounts that are calculated through the gradual change process or the feedback correction process. Also, all the operated amounts that are calculated by the first calculation process during the execution of the first operation process may be operated amounts of the first calculation process that continue to be calculated during the execution of the second operation process.

The controller 70 may be processing circuitry including: 1) one or more processors that operate according to a computer program (software); 2) one or more dedicated hardware circuits (application specific integrated circuits: ASIC) that execute at least part of various processes, or 3) a combination thereof. The processor includes a CPU and memories such as a RAM and a ROM. The memories store program codes or commands configured to cause the CPU to execute processes. The memory, which is computer readable medium, includes any type of media that are accessible by general-purpose computers and dedicated computers.

Various changes inform and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A controller for an internal combustion engine mounted on a vehicle, the controller being configured to change a controlled variable of the internal combustion engine by operating an operated unit of the internal combustion engine, the controller comprising:
 a memory, which is configured to store, in advance
  a relationship defining data set that defines a relationship between a state variable that represents a state of the vehicle and an operated amount of the operated unit, the relationship defining data set being updated during traveling of the vehicle, the state of the vehicle including a state of the internal combustion engine, and
  an adapted data set that is used to calculate the operated amount based on a detected value of the state variable, the adapted data set not being updated during traveling of the vehicle; and
 a processor, which is configured to execute an operation of the operated unit, wherein
 the processor is configured to execute:
  a first calculation process that uses the adapted data set in order to calculate the operated amount on a basis of the detected value of the state variable;

a second calculation process that calculates, as the operated amount, a value that is determined by the relationship defining data set and the state variable;

a reinforcement learning process that calculates a reward on a basis of the detected value of the state variable when the operated unit is being operated by the operated amount calculated by the second calculation process, and updates the relationship defining data set so as to increase an expected return of the reward on a basis of the state variable, the operated amount, and the reward;

a first operation process that executes the first calculation process, and operates the operated unit in accordance with a calculated value of the operated amount by the first calculation process;

a second operation process that executes both of the first calculation process and the second calculation process, and operates the operated unit in accordance with a calculated value of the operated amount by the second calculation process; and a switching process that switches a process that operates the operated unit between the first operation process and the second operation process in accordance with the state of the vehicle.

2. The controller for the internal combustion engine according to claim 1, wherein
the operated unit includes multiple operated units,
the operated amount that is calculated during operations of the operated units by the first operation process includes multiple operated amounts, and
the first calculation process calculates only one or more of the operated amounts during operations of the operated units by the second operation process.

3. The controller for the internal combustion engine according to claim 2, wherein
one of the one or more of the operated amounts is defined as a first operated amount, and
the first calculation process includes a feedback correction process that is executed at calculation of the first operated amount, and corrects the first operated amount in accordance with a deviation of a detected value of the state variable from a target value.

4. The controller for the internal combustion engine according to claim 2, wherein
one of the one or more of the operated amounts is defined as a second operated amount,
the adapted data set includes a data set that defines a map, the map using the state variable as an input, and outputting the second operated amount, and
the first calculation process includes a gradual change process that is executed at calculation of the operated amounts, and
the gradual change process is one of two processes including
a process that uses the detected value of the state variable as an input, and outputs, as an input value to the map, a value that follows the detected value of the state variable after a first delay, and
a process that outputs, as a calculated value of the second operated amount, a value that follows an output value of the map after a second delay.

5. The controller for the internal combustion engine according to claim 1, wherein
the vehicle performs
a manual acceleration travel, in which the vehicle is accelerated or decelerated in response to an operation of an accelerator pedal by a driver, and
an automatic acceleration travel, in which the vehicle is automatically accelerated or decelerated regardless of the operation of the accelerator pedal, and
the switching process switches the process that operates the operated unit between the first operation process and the second operation process depending on whether the vehicle is performing the manual acceleration travel or the automatic acceleration travel.

6. A control method for an internal combustion engine mounted on a vehicle, the method changing a controlled variable of the internal combustion engine by operating an operated unit of the internal combustion engine, the method comprising:
storing, in advance, a relationship defining data set that defines a relationship between a state variable that represents a state of the vehicle and an operated amount of the operated unit, the relationship defining data set being updated during traveling of the vehicle, the state of the vehicle including a state of the internal combustion engine;
storing, in advance, an adapted data set that is used to calculate the operated amount based on a detected value of the state variable, the adapted data set not being updated during traveling of the vehicle; and
executing an operation of the operated unit,
wherein the executing the operation of the operated unit includes:
calculating the operated amount on a basis of the detected value of the state variable using the adapted data set as a first calculation process;
calculating, as the operated amount, a value that is determined by the relationship defining data set and the state variable as a second calculation process;
calculating a reward on a basis of the detected value of the state variable when the operated unit is being operated by the operated amount calculated by the second calculation process, and updates the relationship defining data set so as to increase an expected return of the reward on a basis of the state variable, the operated amount, and the reward as a reinforcement learning process;
executing the first calculation process, and operating the operated unit in accordance with a calculated value of the operated amount by the first calculation process, as a first operation process;
executing both of the first calculation process and the second calculation process, and operating the operated unit in accordance with a calculated value of the operated amount by the second calculation process, as a second operation process; and
switching a process that operates the operated unit between the first operation process and the second operation process in accordance with the state of the vehicle, as a switching process.

* * * * *